United States Patent [19]

Hintze

[11] 4,115,028
[45] Sep. 19, 1978

[54] WIND POWERED CYLINDER

[76] Inventor: Anton E. Hintze, 103 Margaret La., Grass Valley, Calif. 95945

[21] Appl. No.: 811,544

[22] Filed: Jun. 30, 1977

[51] Int. Cl.² .............................................. F03B 3/18
[52] U.S. Cl. .................................................... 415/2
[58] Field of Search .................................. 415/2–4; 290/43, 44, 54, 55

[56] References Cited

U.S. PATENT DOCUMENTS

| 356,634 | 1/1887 | Godfrey | 415/4 |
|---|---|---|---|
| 410,360 | 9/1889 | Ham | 415/4 |
| 648,442 | 5/1900 | Scott | 415/4 |
| 658,129 | 9/1900 | Steude | 415/2 |
| 698,409 | 4/1902 | Neuser | 415/4 |
| 705,922 | 7/1902 | Gran | 415/2 |
| 1,003,635 | 9/1911 | Melander | 415/4 |
| 3,983,404 | 9/1976 | Sherrard | 415/4 |
| 3,986,786 | 10/1976 | Sellman | 415/2 |

Primary Examiner—C. J. Husar

[57] ABSTRACT

This wind powered cylinder consists primarily of a ground level mounted cylinder, which may be coupled to similar sections for being wind rotated at the lowest possible wind speeds, and it is to be controlled by a hydraulic lift and speedometer means so as to maintain a desired speed. The device includes flexible air vanes movable at their outward ends, for directing the air flow, according to the direction of wind flow, into the device, and a power take-off shaft is secured to the cylinder.

2 Claims, 2 Drawing Figures

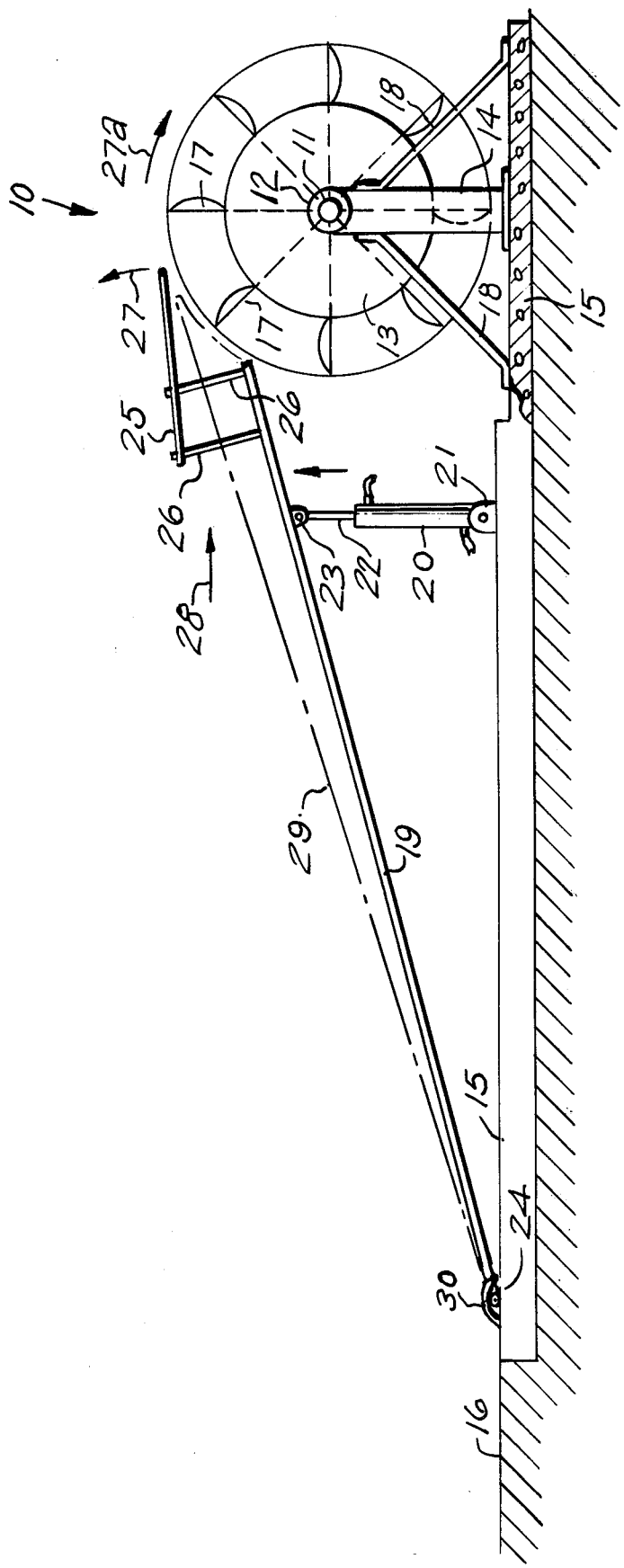

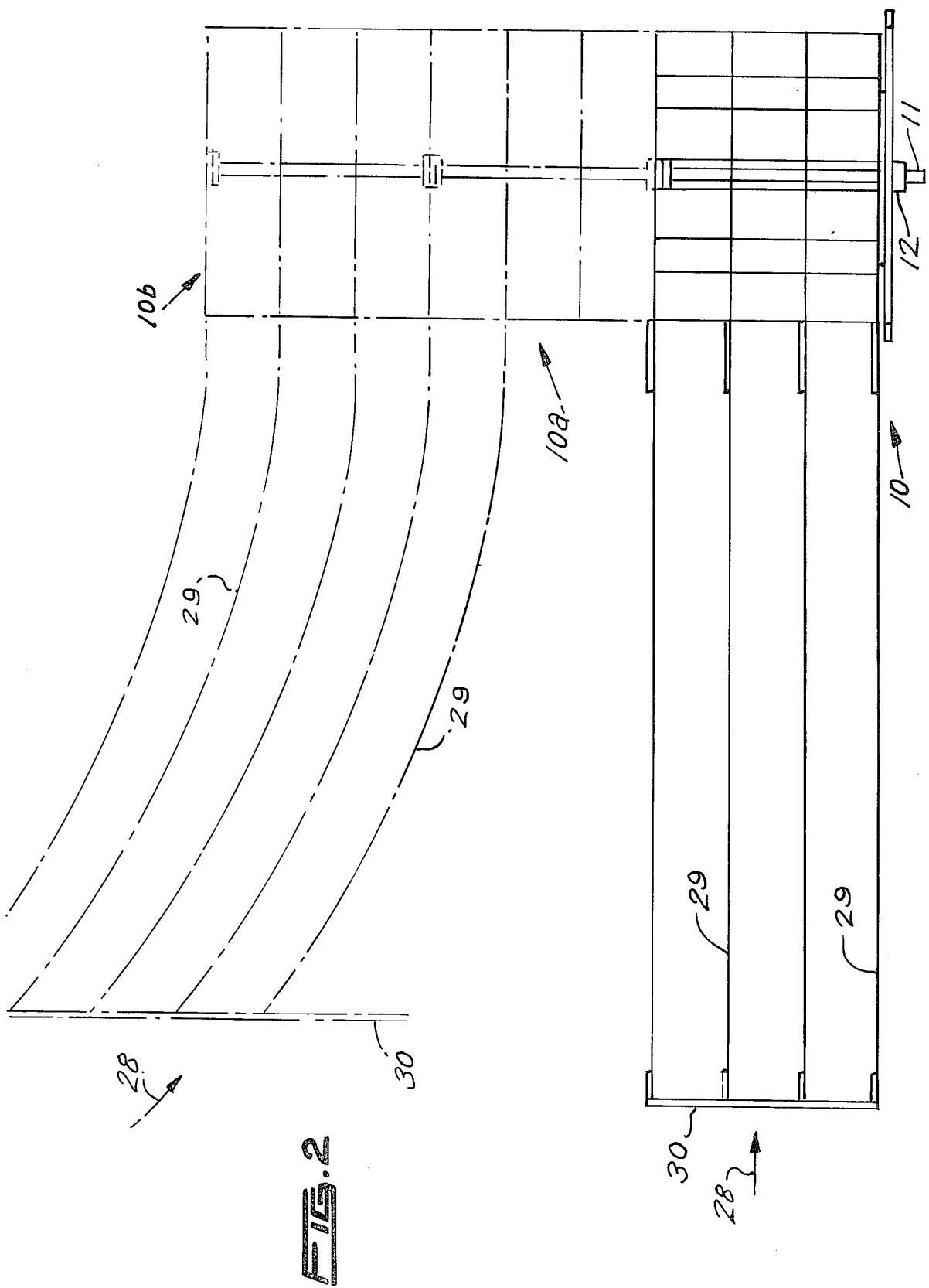

WIND POWERED CYLINDER

This invention relates to air driven devices, and more particularly, to a wind powered cylinder.

The principal object of this invention is to provide a wind powered cylinder, which will effectively employ the use of prevailing winds, to produce electricity.

Another object of this invention is to provide a wind powered cylinder, which will be of low profile, and will have movable vanes for directing the flow of wind of the cylinder, which will rotate.

A further object of this invention is to provide a wind powered cylinder, which will be adaptable for use for driving machinery, if desired.

Other objects of the invention are to provide a wind powered cylinder, which is simple in design, inexpensive to manufacture, rugged in construction, easy to use and efficient in operation.

These and other objects, will be readily evident, upon a study of the following specification, and the accompanying drawing, wherein:

FIG. 1 is a side view of the present invention, shown partly broken away; and

FIG. 2 is a diagrammatic plan view of FIG. 1.

According to this invention, a cylinder 10 is shown to include a longitudinal shaft 11, which is journaled within bearings 12. Other, similar cylinders, 10a and 10b, may be coupled to cylinder 10, as many as is desired for greater power, as is shown in FIG. 2 of the drawings. A shield 13 is secured on the outside of cylinder 10, and cylinder 10 is supported within mounting brackets 14 which are fixedly secured in a suitable manner, to base 15. Base 15 is of concrete, and is positioned flush with ground level 16. A plurality of radially spaced apart vanes 17 are fixedly secured to shaft 11, so as to provide a means of rotating the shaft 11, to which a generator, or machine, may be coupled. A pair of braces 18 are fixedly secured to brackets 14 at one end, and the opposite ends of braces 18 are fixedly secured to base 15.

An elevatable panel 19 is lowered and raised by means of hydraulic cylinders 20, which are pivotally secured in brackets 21 in a well known manner. The piston rods 22, of cylinders 20, are secured pivotally within brackets 23, which are fixedly secured to the bottom surface of panel 19. Panel 19 is hinged at 24. A sheet 25 is angularly spaced from one end of panel 19, and is fixedly secured thereto by means of spaced apart dowels 26. The sheet 25, in conjunction with panel 19, serves as compression means for the air that is directed to cylinder 10, and the over-hanging end of sheet 25, and panel 19, is elevatable in the vicinity of the tangency, with the outer periphery of cylinder 10, for maximum efficiency.

Arrow 27 indicates the direction of movement, and arrow 27a indicates the direction of rotation of cylinder 10. The spaced apart vanes 29 are sidewardly movable at their outward ends by the attached, sliding bar 30, which controls the direction of wind flow.

It shall be noted, that this above mentioned movement is effected by devices, (not shown), which are well known in the art, and sliding bar 30 enables greater wind pressure on the cylinder 10, when the wind is not ninety degrees of cylinder 10. It is movable, so as to produce troughs of air from twenty to eighteen degrees away from dead-center, which will increase the efficiency of operation, when the wind changes direction.

It shall be further noted, that cylinder 10 may be constructed in a line of more than one hundred feet, when desired.

While various changes may be made in the detail construction, it is understood that such changes will be within the spirit and scope of the present invention, as is defined by the appended claims.

What I now claim is:

1. A wind powered cylinder, comprising a longitudinal shaft having radially and equally spaced-apart vanes secured therein for being driven by natural wind force, support bracket means secured to the cylinder for mounting it in a low horizontal profile to a base, stationary on a ground surface, a panel pivotally and elevatably secured to said base, with parallel, spaced-apart and sidewardly movable, flexible vertical vanes thereon, for directing a wind to said cylinder, a plate secured to said panel, providing air compression means for air directed to the cylinder, and a means for elevating and lowering said panel and said plate with respect to the outer periphery of said cylinder; said radially and equally spaced-apart vanes of said cylinder being fixedly secured to said longitudinal shaft, and said shaft being journaled within bearings secured within said support bracket means, said support bracket means being fixedly secured to said base, said panel being hinged to a top of said base at one end, and being freely elevatable at its opposite end which is in close proximity with the outer periphery of said cylinder, hydraulic cylinders pivotally secured in brackets fixedly secured on said base, piston rods of said hydraulic cylinders being pivotally mounted within bracket means secured fixedly to the underside of said panel, said vertical vanes upon said panel being arcuately movable thereupon by outward ends of said vertical vanes being secured to a horizontally slideable bar so that said outward ends of said vertical vanes are movable respective to a wind direction and wind to enter between said vertical vanes, and said plate being angularly disposed and overhanging an end of said panel in the outer peripheral area of said cylinder.

2. The combination according to claim 1, wherein said plate is fixedly secured to said panel by dowel means and the combination of said plate and said panel provides compression means for the wind being guided by said movable vanes to the said vanes of said cylinder, and said panel and plate combination directs the wind to the tangency area of said cylinder where the said vanes of said cylinder terminate at the outer periphery thereof.

* * * * *